3,129,196
ALKOXYLATED POLYVINYL ALCOHOL AND ALKOXYLATED AMIDE COMPOSITIONS

Philip L. Gordon, Lexington, Mass., assignor to The Borden Company, New York, N.Y., a corporation of New Jersey
No Drawing. Filed May 12, 1961, Ser. No. 109,484
7 Claims. (Cl. 260—32.6)

This invention relates to a plasticized alkoxylated polyvinyl alcohol composition and the process of making it.

The invention is particularly useful in making films for heat sealed packages and will be illustrated by description in connection with such uses.

We have found that alkoxylated polyvinyl alcohol plasticized with alkoxylated higher fatty acid amides give films that, during heat sealing, withstand higher temperatures without over-softening than do films of the alkoxylated polyvinyl alcohol with usual plasticizers. If used at the usual heat sealing temperatures, my films distort less than the conventional films under the tension to which the heated edge portions of the films are necessarily subjected as they are brought into sealing contact. Also such films preserve their flexibility as shown by resistance to cracking on shaking at temperatures down to about 20° to 25° F. In other words, the plasticizer serves different and seemingly contradictory functions at the two ends of the temperature scale.

A disadvantage arises, however, in the introduction of the alkoxylated amides into alkoxylated polyvinyl alcohol. The mixture so made gives a hazy solution in water. Films cast from the solution also appear hazy when objects are viewed through the film laid thereover.

The present invention provides a process and product in which this objectionable lack of clarity of a film thus "read through" is either eliminated completely or reduced to an unobjectionable level. It provides also a product characterized by exceptionably good release properties which facilitate parting from hot or cold smooth surfaces against which the composition may have been pressed or otherwise formed.

Briefly stated, the invention comprises the herein described process and product resulting from mixing a higher fatty acid amide and polyvinyl alcohol and then jointly alkoxylating the mixed amide and the alcohol under conditions, such as alkaline catalysis, that favor interchange of groups. A modification of the invention comprises the separate alkoxylation of the polyvinyl alcohol and of the said amide and the subsequent admixture of the two alkoxylated products, this modification being useful only for purposes in which haziness of the product in film form is not objectionable.

The polyvinyl alcohol used for the alkoxylation may be any commercial grade as all grades, after the alkoxylation, are improved by the plasticizer. Examples are polyvinyl alcohol representing polyvinyl acetate hydrolyzed to the extent of 80%–100% and having in a 4% solution in water at 68° F. a viscosity range of 3–100 cps. Degrees of hydrolysis of 96%–100% and viscosities of 20–75 cps. are recommended for best cracking resistance of the final product in film form at low temperatures.

The amide used for the ethoxylation is the amide of an aliphatic monocarboxylic acid, either saturated or unsaturated. The amide may contain a simple $NH_2$— group or be N-substituted. The formula for the amide is

in which R is an alkyl or alkenyl group having 11–19 carbon atoms each and R' and R'' represent the same or a different component selected from the group consisting of hydrogen, $C_1$–$C_{10}$ alkyl and alkenyl groups, and hydroxy substituted $C_2$–$C_4$ alkyl groups. The number of carbons present in the amide is selected within the ranges stated so that the amide will be soluble in water after the alkoxylation. Amides that we can use and that illustrate the class are lauramide, palmitamide, oleamide, and stearamide and the corresponding mono- and diethanol substituted amides, an illustrative example of the latter being the N-ethanol amide of stearic acid, $C_{17}H_{35}$—CO—NH—$C_2H_4$OH. Another amide which we have used is Emcol 5130, this being the diethanolamide of a mixture of palmitic, oleic, and stearic acids, the said amide being in the condition of having been ethoxylated with 20 moles of ethylene oxide to 1 mole of the amide.

When using any of the amides without previous alkoxylation, we mix the amide into the polyvinyl alcohol and then alkoxylate in manner conventional for alkoxylation of polyvinyl alcohol alone. Suitable conditions are the use of ethylene oxide as the alkoxylating agent, its introduction into the mixed polyvinyl alcohol and higher fatty acid amide at a pressure of about 5–30 p.s.i., at 60°–90° C., for 4 hours and in amount to provide 20–100 and advantageously 25–40 parts by weight for each 100 parts of the polyvinyl alcohol, amounts of the oxide above about 40 parts giving a product too limp for some purposes. The catalyst is any alkaline catalyst of ethoxylation of polyvinyl alcohol, e.g., 0.5%–5% of ammonia as 26% ammonium hydroxide solution on the weight of the polyvinyl alcohol and/or an amine such as mono-, di-, or triethanolamine or dimethyl, mono-, di-, or triethyl amine, all of these amines being known to be soluble in water.

We introduce alkylene oxide units (actually residues that are hydroxylalkyl radicals) in number at least adequate to make the alkoxylation product of the selected aliphatic acid amide soluble in water. This number of units required will vary somewhat with the size of the alkyl groups in the amide or with the substituents if any replacing hydrogen in the amide group. We use, for example, 3–30 and suitably 5–20 moles of the alkylene oxide for 1 mole of the amide, more than 30 being usually unnecessary and also undesirable in causing excessive dilution of the amide moiety and properties of the product. The introduction of the alkylene oxide gives an N,N-polyalkoxy amide of which an example would be N,N-polyethoxy stearamide.

In place of the ethylene oxide, I may use an equal weight of any other $C_2$–$C_4$ alkylene oxide having an oxirane group therein as, for instance, 1,2-isopropylene or 2,3-n-butylene oxide, the temperature or time required for the alkoxylation or both being increased as the number of carbons in the oxide becomes larger.

When the amide is prealkoxylated, as for those uses not requiring the clarity of film of product referred to, the amide is alkoxylated under the conditions described except that the polyvinyl alcohol is omitted. The product, normally a liquid, is then mixed with the polyvinyl alcohol.

The proportion of the amide used is about 1 to 10 parts and suitably 3–6 parts for 100 parts of the polyvinyl alcohol, both amounts being on the alkylene oxide free basis. Use of more than 6 parts introduces the tendency to exudation of the plasticizer. The minimum required for the release (parting) property is 1 part.

In the following examples and elsewhere herein proportions are expressed as parts by weight unless specifically stated to the contrary.

Example 1

Into a pressure reactor equipped with heating, cooling and agitating means there were charged 100 parts of polyvinyl alcohol having the viscosity of 30 centipoises when tested as above, representing polyvinyl acetate hydrolyzed to the extent of 98% and being in the form of a fine powder of which 95% by weight was of size to pass through 140 mesh. There were introduced 11 parts of N-diethanol substituted stearamide alkoxylated with 20 moles of ethylene oxide to 1 mole of the amide and approximately 1.3 parts of a 26% aqueous solution of ammonium hydroxide. While the whole mass was agitated continuously, ethylene oxide was admitted in the amount of 36 parts, in about 2.5 hours and at a maximum pressure of 28 p.s.i. gauge. The temperature of the mass was maintained at 70°–75° C. by warming initially and subsequently cooling the batch. The product released cleanly from the equipment used.

The reacted mixture in the form of fine powder was then discharged from the reaction vessel.

*Example 2*

The procedure of Example 2 is followed except that the amide there used is replaced in turn by an equimolar weight of each of the other amides shown herein.

*Example 3*

The procedure and composition of Example 1 are used except that the substituted stearamide there used is replaced by an equal weight of the N-diethanol substituted amide of oleic acid, of the formula

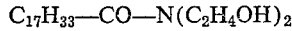
$$C_{17}H_{33}-CO-N(C_2H_4OH)_2$$

*Example 4*

The alkoxylated products made by the joint alkoxylation of the polyvinyl alcohol and the amide as described in Examples 1–3, are dissolved in water to a concentration of 20% and the solution cast on a smooth horizontal steel plate and then dried, to give a film about 0.002 inch thick. The film appeared clear when placed against a surface and the surface viewed through the film.

The film was more resistant to softening at high temperatures than usual plasticized alkoxylated polyvinyl alcohol films. In fact it developed softness only at temperatures of about 400° F. or higher, as compared to heat sealing temperatures of about 380° F. for conventionally plasticized alkoxylated polyvinyl alcohol films of this type.

*Example 5*

The procedure and composition of Example 1 are followed except that the stearamide is omitted from the ethoxylation step. After the ethoxylation is effected to the extent there shown, the resulting product in powdered form is mixed with 11% of its weight of prealkoxylated stearamide having the residues from 20 moles of ethylene oxide for 1 mole of the amide. The resulting blend is satisfactory for film manufacture with the exception of the cloud in the solution and in the film cast therefrom.

It will be understood that it is intended to cover all changes and modifications of the examples of the invention herein chosen for the purpose of illustration which do not constitute departures from the spirit and scope of the invention.

I claim:

1. In making a plastic composition suitable for film, the process which comprises forming a mixture of polyvinyl alcohol and a higher fatty acid amide of the formula R—CO—NR'R", in which R is selected from the group consisting of alkyl and alkenyl radicals having 11–19 carbon atoms each and R' and R" are components selected from the group consisting of hydrogen, $C_1$–$C_{10}$ alkyl and alkenyl groups, and hydroxy substituted $C_2$–$C_4$ alkyl groups and a water soluble alkali serving as catalyst of alkoxylation of polyvinyl alcohol and introducing an alkylene oxide having an oxirane group and 2–4 carbon atoms to the molecule into the said mixture at a temperature of about 60°–90° C. until the proportion of the alkylene oxide introduced and reacted with the mixture corresponds to 20–100 parts by weight for 100 parts of polyvinyl alcohol used and 3–30 moles for 1 mole of the amide.

2. The process of claim 1, the said alkylene oxide being ethylene oxide and the said alkali being selected from the group consisting of ammonia and water soluble amines.

3. The process of claim 2, the said amide being stearamide.

4. The process of claim 3, the stearamide being N-substituted by ethanol groups and being of the formula $C_{17}H_{35}$—CO—N$(C_2H_4OH)_2$.

5. The process of claim 1 the proportion of the said amide being approximately 1–10 parts by weight for 100 parts of the polyvinyl alcohol and the alkylene oxide used being ethylene oxide.

6. A plastic composition comprising an intimate blend of alkoxylated polyvinyl alcohol and the product of alkoxylation of a higher fatty acid amide with an alkylene oxide having an oxirane ring and 2–4 carbon atoms to the molecule, the amide being of the formula R—CO—NR'R" in which R is selected from the group consisting of alkyl and alkenyl radicals having 11–19 carbon atoms each and R' and R" are components selected from the group consisting of hydrogen, $C_1$–$C_{10}$ alkyl and alkenyl groups, and hydroxy substituted $C_2$–$C_4$ alkyl groups, the proportions being about 1 to 10 parts by weight of the said amide for 100 parts of polyvinyl alcohol and 3–30 moles of the alkylene oxide for 1 mole of the said amide, and the polyvinyl alcohol being alkoxylated with 20–100 parts of the alkylene oxide for 100 parts of the said alcohol.

7. The plastic composition of claim 6, the alkylene oxide being ethylene oxide.

References Cited in the file of this patent

UNITED STATES PATENTS

| | | |
|---|---|---|
| 2,844,571 | Broderick | July 22, 1958 |
| 2,990,398 | Inskip et al. | June 27, 1961 |